(12) United States Patent
Giudiceandrea et al.

(10) Patent No.: US 12,290,029 B2
(45) Date of Patent: May 6, 2025

(54) PROCESSING HEAD FOR A FORESTRY MACHINE

(71) Applicant: MICROTEC S.R.L., Bressanone BZ (IT)

(72) Inventors: Federico Giudiceandrea, Bressanone (IT); Martin Bacher, Pfalzen (IT); Enrico Ursella, Mestre (IT)

(73) Assignee: MICROTEC S.R.L., Bressanone BZ (IT)

( * ) Notice: Subject to any disclaimer, the term of this patent is extended or adjusted under 35 U.S.C. 154(b) by 714 days.

(21) Appl. No.: 17/502,498

(22) Filed: Oct. 15, 2021

(65) Prior Publication Data
US 2022/0124990 A1 Apr. 28, 2022

(30) Foreign Application Priority Data
Oct. 27, 2020 (IT) .......................... 102020000025426

(51) Int. Cl.
*A01G 23/083* (2006.01)
*A01G 23/095* (2006.01)
(Continued)

(52) U.S. Cl.
CPC .......... *A01G 23/083* (2013.01); *A01G 23/095* (2013.01); *G01L 5/0052* (2013.01);
(Continued)

(58) Field of Classification Search
CPC ...... A01G 23/00; A01G 23/08; A01G 23/083; A01G 23/091; A01G 23/095
See application file for complete search history.

(56) References Cited

U.S. PATENT DOCUMENTS 7,149,633 B2 * 12/2006 Woods ................... G01N 33/46
73/598
9,534,887 B2 * 1/2017 Einola .................. G01B 5/0035
(Continued)

FOREIGN PATENT DOCUMENTS

GB     2400009 A    10/2004
WO    0213597 A1     2/2002
(Continued)

*Primary Examiner* — Matthew Katcoff
(74) *Attorney, Agent, or Firm* — Chrisman Gallo Tochtrop LLC

(57) ABSTRACT

A processing head (10) for a forestry machine (1) is intended to process a tree (9) having a trunk (92) with a longitudinal direction (90), branches (94) extending from the trunk (92) transversely to the longitudinal direction (90) and knots (96) extending into the trunk (92). The processing head (10) comprises: a frame (2) having a seat (20) for receiving the trunk (92) of the tree (9) to be processed; a motorised device for moving the trunk (92) relative to the seat (20), by advancing the trunk (92) through the seat (20) along the longitudinal direction (90) of the trunk (92); one or more blades (26) for cutting the branches (94) from the trunk (92) as the trunk (92) advances; a detection system for detecting positions of the branches (94) and/or of the knots (96) on the trunk (92) as the trunk (92) advances. Information on the positions of the branches (94) and/or of the knots (96) is processed to determine an identification code that is based on said positions and that refers to said trunk (92) or to a segment obtained from said trunk (92). The identification code is comparable against a code determined a posteriori for a specific trunk or for a specific segment of trunk, in order to establish whether the specific trunk or the specific segment of trunk corresponds to said trunk (92) or to said segment of trunk (92). The information on the positions of branches (94) and/or of knots (96) can also be used to determine, during a processing of the tree (9), one or more (Continued)

positions on the trunk (92) in which to cut the trunk (92) perpendicularly or transversely to the longitudinal direction (90), which is to say to optimise the truncation of the trunk (92).

15 Claims, 4 Drawing Sheets

(51) Int. Cl.
  *G01L 5/00* (2006.01)
  *G01N 23/04* (2018.01)
  *G01N 23/083* (2018.01)
(52) U.S. Cl.
  CPC ............ *G01L 5/0061* (2013.01); *G01N 23/04* (2013.01); *G01N 23/083* (2013.01); *G01N 2223/619* (2013.01)

(56) References Cited

U.S. PATENT DOCUMENTS

| | | | |
|---|---|---|---|
| 10,321,638 B2* | 6/2019 | Kaye | A01G 23/02 |
| 10,806,103 B2* | 10/2020 | Alfthan | A01G 23/083 |
| 2007/0251600 A1 | 11/2007 | Lennartsson | |
| 2010/0230008 A1* | 9/2010 | Kondo | A01G 23/083 |
| | | | 144/338 |
| 2011/0265912 A1 | 11/2011 | Arvidsson | |
| 2018/0317397 A1* | 11/2018 | Carter | G05B 19/182 |

FOREIGN PATENT DOCUMENTS

| | | |
|---|---|---|
| WO | 2005043983 A1 | 5/2005 |
| WO | 2006126952 A2 | 11/2006 |
| WO | 2009157864 A1 | 12/2009 |
| WO | 2012087220 A1 | 6/2012 |

\* cited by examiner

PROCESSING HEAD FOR A FORESTRY MACHINE

The subject of this invention generally relates to the timber sector. In particular, the invention relates to a processing head for a forestry machine, which is intended to process trees to obtain trunks or segments of trunks.

In the sector, there is a known need to identify and trace pieces of timber along a processing chain in order to associate the respective information to a specific piece of timber and to recall this information when necessary. Examples of such information include the cutting place and date for the tree that the piece of timber comes from, the wood species, quality assessments, defects, cutting patterns.

According to currently known methods, the trunk of a felled tree is usually marked manually with an identification code that allows it to be subsequent identified in the subsequent stages of transportation and initial processing. However, this is inconvenient for operators, who must mark the trunks one by one, and is also a potential source of errors. In fact, the code on the trunk could subsequently wear off over time or become illegible, or it could be made incorrectly or, in any case, in a way that would not allow the trunk to be clearly identified.

In this context, the technical purpose underlying the invention described herein is to provide a method for identifying trunks and segments of trunk that allows the above-mentioned drawbacks in the prior art to be overcome or at least offers an alternative solution to those already known.

The technical purpose and the aims stated above are substantially achieved by a method for providing a trunk with an identification code according to claim 10 and, in order to implement this method, by a processing head for a forestry machine according to claim 1. Particular embodiments of the invention are defined in the corresponding dependent claims.

According to one aspect of the invention, information on the positions of branches and/or of knots on a trunk of a tree are used to determine an identification code of said trunk or of a segment obtained from said trunk.

Since each tree has its own growth history that also depends on the particular and specific conditions in which the tree developed, the set of positions in which the branches and knots are located on the trunk can be considered to be substantially univocal for each tree—at least to a certain extent—and, therefore, can be used as a trunk's "fingerprint". Therefore, determining these positions enables to have information for recognising the trunk a posteriori.

According to the method of the invention, the positions of the branches and/or of the knots on the trunk are detected during a processing of the tree in which the branches are cut from the trunk. This can be done simultaneously with a felling of the tree, or can be done on an already felled tree. This operation is preferably performed directly in a wood or in a forest where the tree for felling or already felled is located, before it is transported elsewhere. The information on the positions of the branches and/or of the knots is processed in order to determine an identification code that is based on said positions and refers to said tree trunk, which is to say it is specific for said trunk.

Such identification code, for instance, consists of the positions of the branches and knots in a cylindrical coordinate system centred on a longitudinal axis of the trunk. Alternatively, the identification code can be an image in electronic format in which the positions of the branches and of the knots are shown on a map of the trunk, or else the identification code can be obtained from a mathematical processing of the positions. Obviously, other methods of defining the identification code are possible. The identification code is stored in a database and can be compared against a code determined a posteriori for a specific trunk: when having an "unknown" trunk, an optical scan of the trunk can be performed to determine the positions of the branches and of the knots, the respective identification code can be determined on the basis of this information and the identification code obtained can be compared against those stored in the database to search for a corresponding identification code. This makes it possible to establish whether the specific unknown trunk corresponds to a known trunk that is present in the database.

The same method can also be applied to segments obtained from the trunk. (Here, "segment" means a portion of trunk obtained by cutting the trunk along cutting planes, preferably transversely or perpendicular to the longitudinal axis of the trunk itself. In Italian language, such a portion of the trunk is also known as a "toppo" or "ceppo".)

Indeed, each segment includes part of the branches and knots of the trunk from which it was obtained and, therefore, a respective identification code can also be determined for the segment. If necessary, when having an unknown segment, by comparing its identification code obtained from the scan against the identification codes stored in the database, it is possible to establish whether the segment derives from a specific known trunk that is present in the database. The identification code of the segment is in fact a subset of the identification code of the trunk from which it was obtained.

The reliability of identifying the trunk or the segment also depends on the length of the trunk or segment: the greater its length, the greater the number of branches and knots present, meaning that the identification code for the trunk or the segment is more specific, as it is based on a greater amount of information than a corresponding trunk or segment of a shorter length. In particular, the identification code for a trunk is more specific than the identification code for a segment obtained from the same trunk.

The identification code can be considered substantially univocal.

The method of the invention is useful because it defines an identification code of the trunk that, in addition to being substantially univocal, is intrinsic to the trunk itself and therefore is not subject to damage or wearing off. Furthermore, this identification code, being already intrinsic to the trunk, does not require any intervention by an operator to be created or applied.

According to another aspect of the invention, the information for determining the identification code of a trunk is acquired by a processing head intended to process a tree to cut the branches from it.

Specifically, the processing head is part of a forestry machine commonly known in the sector as a "harvester", which can be positioned near a tree for felling or near a tree that has already been felled: the processing head is configured to grasp the trunk of the tree, to cut the trunk and to cut branches from the trunk, thus obtaining, in a single step, a cut trunk (or segments of trunk) that is devoid of branches and is ready to be transported.

Machines of this type are already known per se. The present invention differs from those in that it also enables the positions of the branches and/or of the knots to be detected, in order to determine the identification code of the trunk.

This is useful because it allows the identification code to be assigned to the trunk automatically and in the same step as that in which the trunk of the tree just felled is processed, even during the felling of the tree. This entirely removes the need for any intervention by the operator and the risk of a cut trunk being carried away without having been assigned an identification code.

According to another aspect of the invention in a particular embodiment, the processing head also allows the trunk to be cut into segments that have an optimised length for maximising the yield in terms of the quality of the products obtainable; in other words, it allows the truncation of the trunk to be optimised. This optimisation is calculated based on the information on the positions of the branches and/or of the knots that are detected by the processing head itself during the processing of the trunk. This is advantageous over the prior art, in which the trunk is cut into segments of a fixed and predetermined length without taking into account the specificities of each individual trunk from the perspective of its potential yield.

It should be noted that this other aspect is independent from the determination of the identification code described above. Therefore, it represents a method of using the processing head that is advantageous in itself, even when the trunk and the segments of trunk are not allocated any identification code.

Further features and the advantages of this invention will become more apparent from the following detailed description of one embodiment thereof, which is presented here for exemplifying and non-limiting purposes.

Reference will be made to the figures in the accompanying drawings, wherein.

Figure 1:
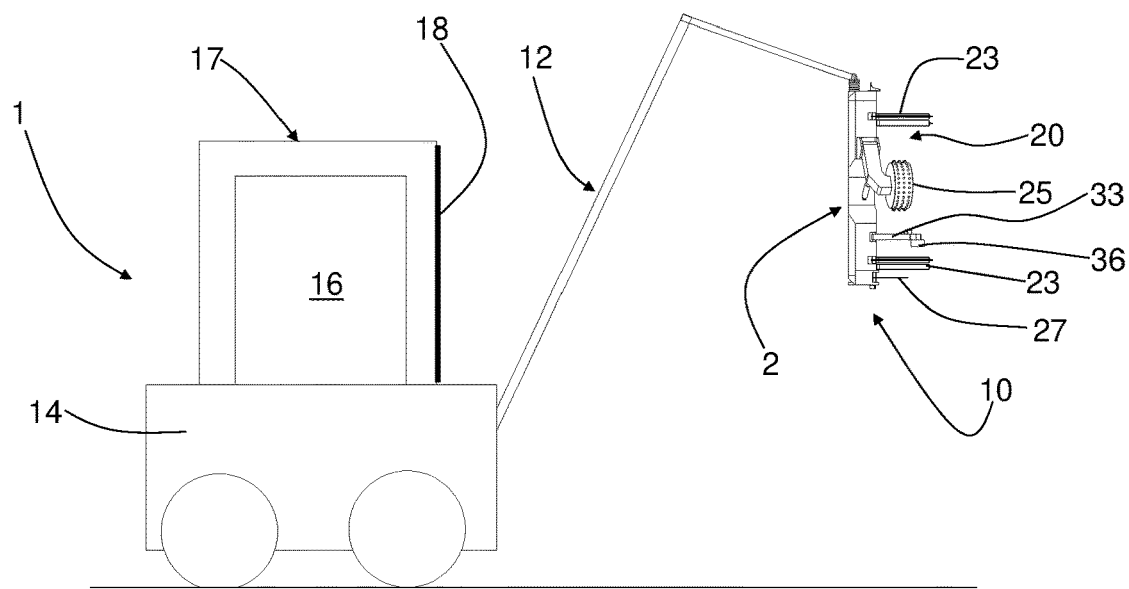
FIG. 1 shows a simplified side view of a forestry machine comprising a processing head according to the invention.

A forestry machine 1, or harvester, comprising a processing head 10 according to the present invention is shown in FIG. 1 in an extremely simplified way.

The forestry machine 1 is a vehicle capable of moving even over uneven ground (such as the ground of a wood or a forest) in order to position itself near a tree to be felled or near a tree that has already been felled. The forestry machine 1 is provided with a mechanical arm 12, which is supported by a framework 14 of the vehicle, and the processing head 10 is mounted on the mechanical arm 12. The processing head 10 can be moved and rotated by the mechanical arm 12 and can be controlled by an operator on board the forestry machine 1 or by an automated system. In particular, the forestry machine 1 comprises a station 16 for an operator on board the vehicle. Specifically, the station 16 is inside a cabin 17.

The forestry machine 1 differs from those currently known in terms of some aspects of the processing head 10, as shown below. Already known characteristics of the forestry machine will not be further described in detail.

The processing head 10 is intended to process a tree 9 having a trunk 92 with a longitudinal direction 90, branches 94 extending from the trunk 92 transversely to the longitudinal direction 90 and knots 96 extending into the trunk 92. The processing head 10 is configured to grasp the trunk 92 of the tree 9, to cut the trunk 92 and to cut the branches 94 from the trunk 92, thus obtaining a cut trunk that is devoid of branches and ready to be transported. Optionally, the processing head 10 can split the trunk 92 into segments of trunk.

The processing head 10 comprises a frame 2 that has a seat 20 for receiving the trunk 92 of the tree 9 to be processed. Since the trunk 92 has a length that is much greater than the extension of the seat 20, obviously only a portion of the trunk 92 is inside the seat 20 and the rest of the trunk 92 protrudes from opposite sides of the seat 20.

In particular, the frame 2 comprises a main body 21, having a box-like shape, and protruding arms 23 mounted on the main body 21, from which the protruding arms 23 protrude from the side opposite the mechanical arm 12. The protruding arms 23 are arranged in pairs (in the embodiment illustrated there are two pairs of protruding arms 23), each pair being formed by two arms 23 opposite each other. The protruding arms 23 are pivoted to the main body 21 and, in each pair, they are movable towards and away from each other. The protruding arms 23 of each pair are offset relative to each other, in such a way that they cannot come into contact with each other during their reciprocal movement.

The seat 20 is an open seat and is a volume (ideally cylindrical, like the trunks 92 it receives) surrounded by a face 210 of the main body 21 and by the protruding arms 23. The protruding arms 23 limit the lateral movements of the trunk 92 in the seat 20: the arms 23 of each pair enclose a section of the trunk 92 between them and, in use, are positioned in contact with the lateral surface of the trunk 92. The protruding arms 23 have a curved shape to approximately follow the—substantially cylindrical—lateral surface of the trunk 92 and, thanks to their reciprocal movement being possible, their distance can be varied according to the diameter of the trunk 92.

The processing head 10 comprises a motorised device for moving the trunk 92 relative to the seat 20. The motorised device is configured to advance the trunk 92 through the seat 20 along the longitudinal direction 90 of the trunk 92. In particular, the motorised device comprises two arms 24 that are pivoted to the main body 21 and that are each provided with a roller 25 (in particular a roller that is toothed or with pointed protrusions) that is motorised or, in any case, can be made to rotate by an engine. The rollers 25 of the arms 24 face opposite parts of the seat 20. When the trunk 92 is received in the seat 20, the arms 24 are moved by actuators 245 so that the rollers 25 come into contact with the surface of the trunk 92 and are pressed against the lateral surface of the trunk 92, thus clamping the trunk 92 between them. When the motors of the rollers 25 are operated, the two rollers 25 rotate in opposite directions of rotation and push the trunk 92 along the longitudinal direction 90. A further motorised roller 25 can be mounted in the main body 21, so as to protrude from the face 210 towards the seat 20.

The processing head 10 comprises one or more blades 26 for cutting off the branches 94 from the trunk 92 as the trunk 92 advances through the seat 20. Specifically, at least some blades 26 are on the protruding arms 23, in particular each blade 26 extends lengthwise along an edge of the respective protruding arm 23, the edge being that which is facing the seat 20. The blades 26 have a curved shape—like the protruding arms 23—to follow the cylindrical surface of the trunk 92 as much as possible. Other blades 26 are on the main body 21, protruding from the top and/or the bottom of the face 210 that is facing the seat 20.

Figure 2:
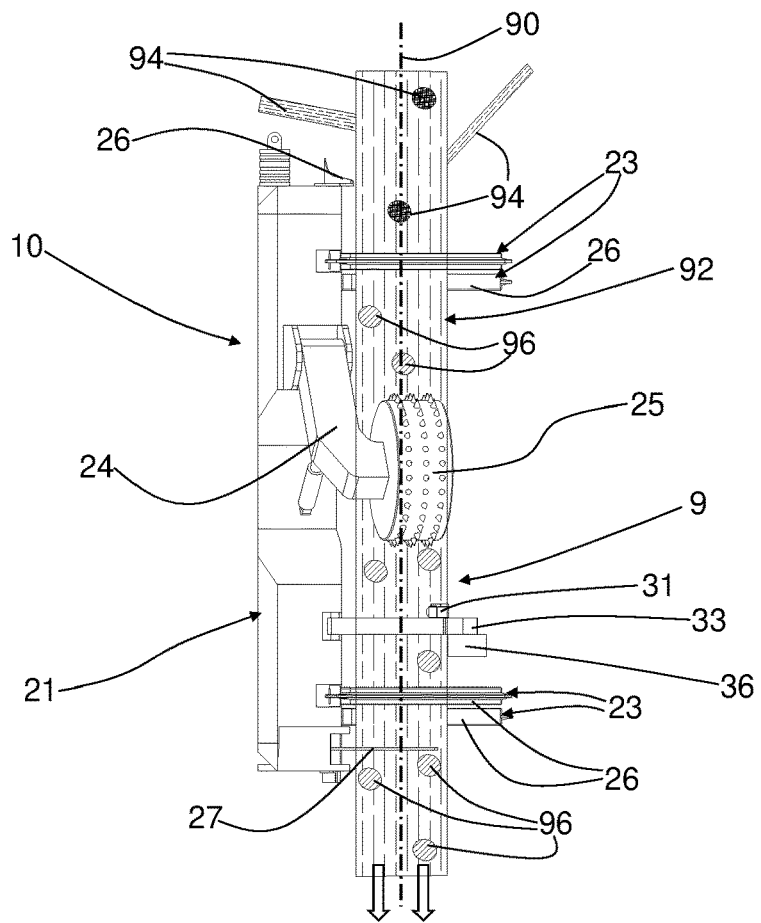
FIG. 2 shows a side view of the processing head according to the invention, in which a tree during a processing phase is also shown.
Figure 3:
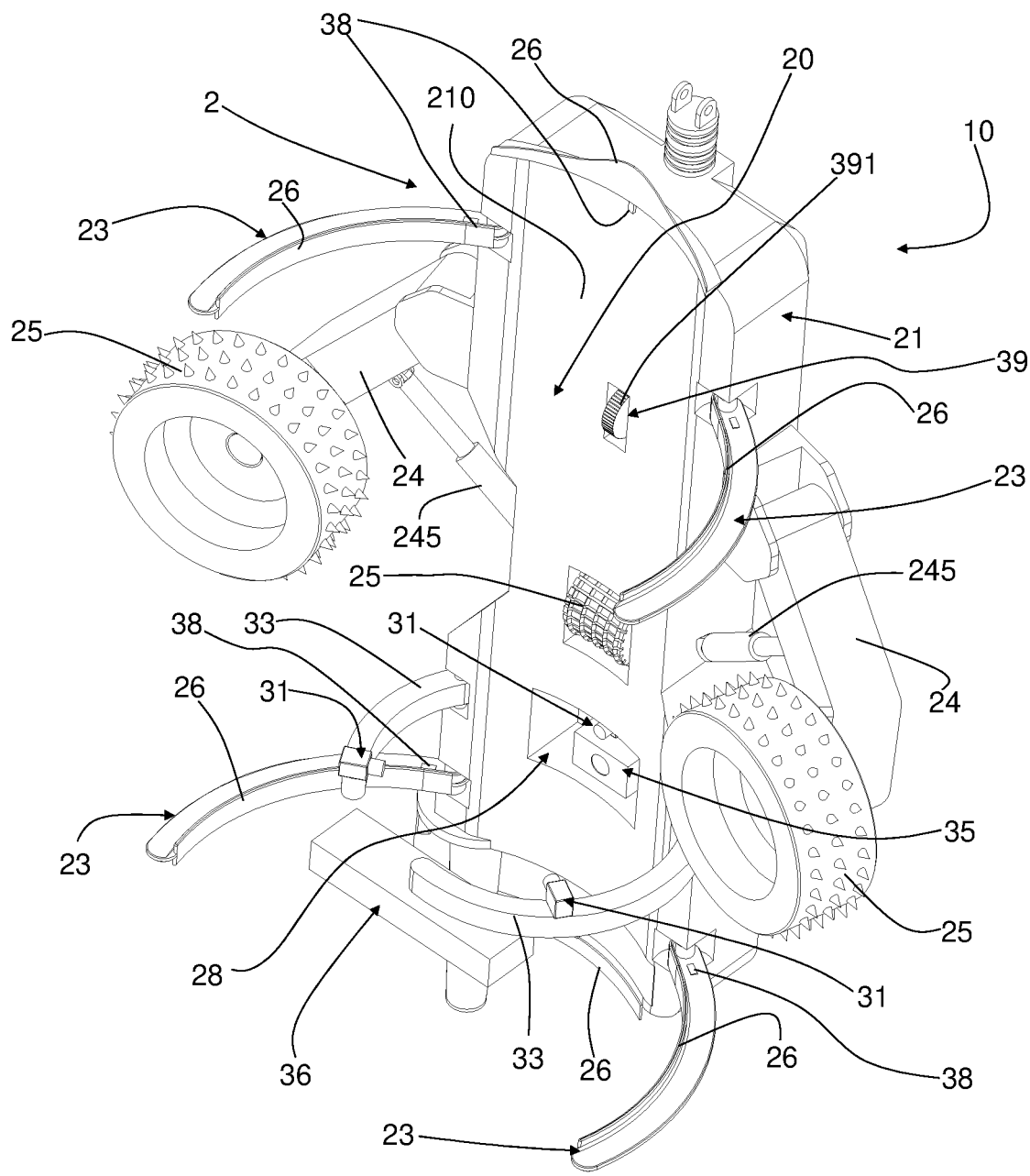
FIG. 3 is a perspective view of the processing head in FIG. 2.
Figure 4:
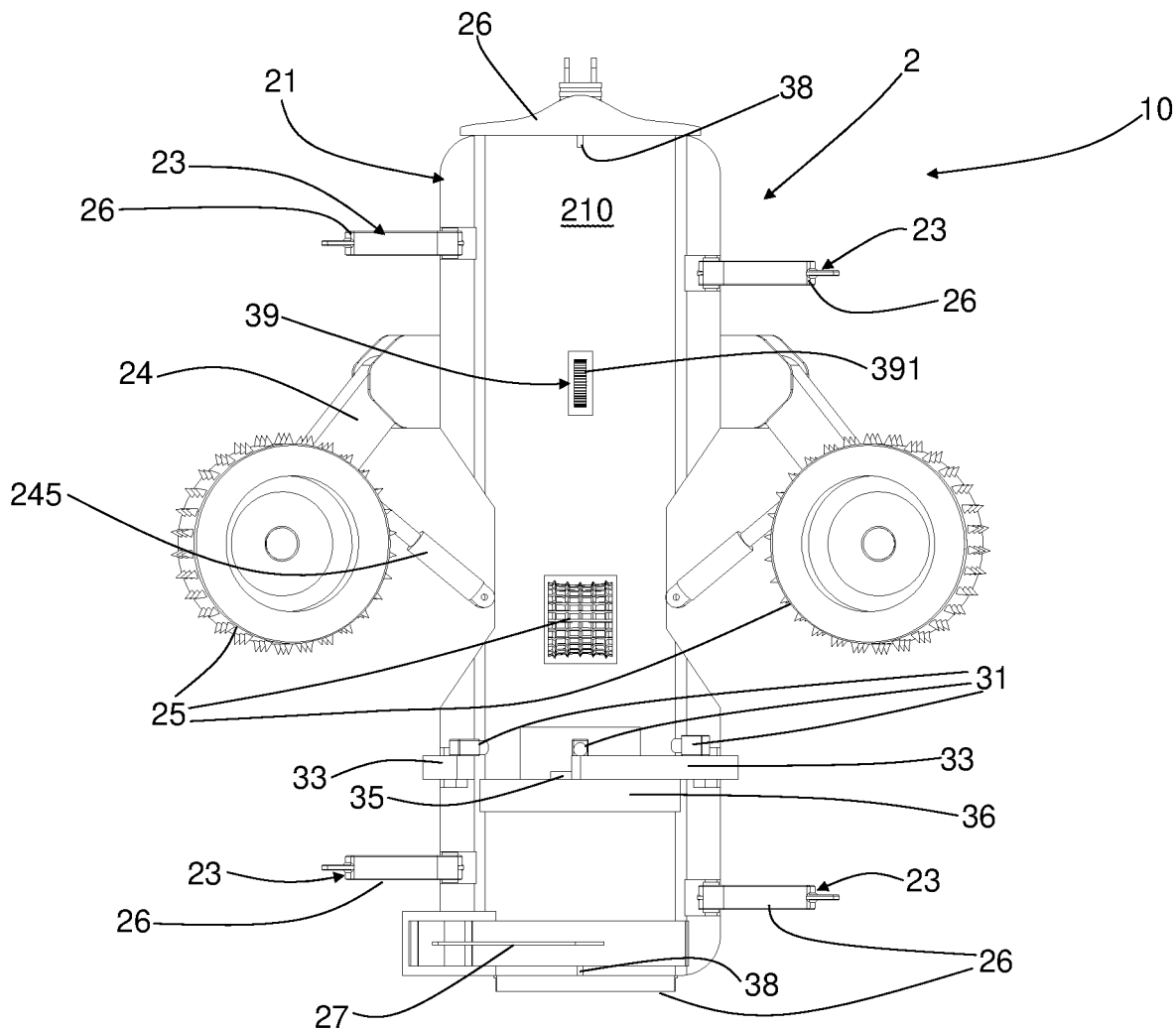
FIG. 4 is a front view of the processing head in FIG. 2.
Figure 5:
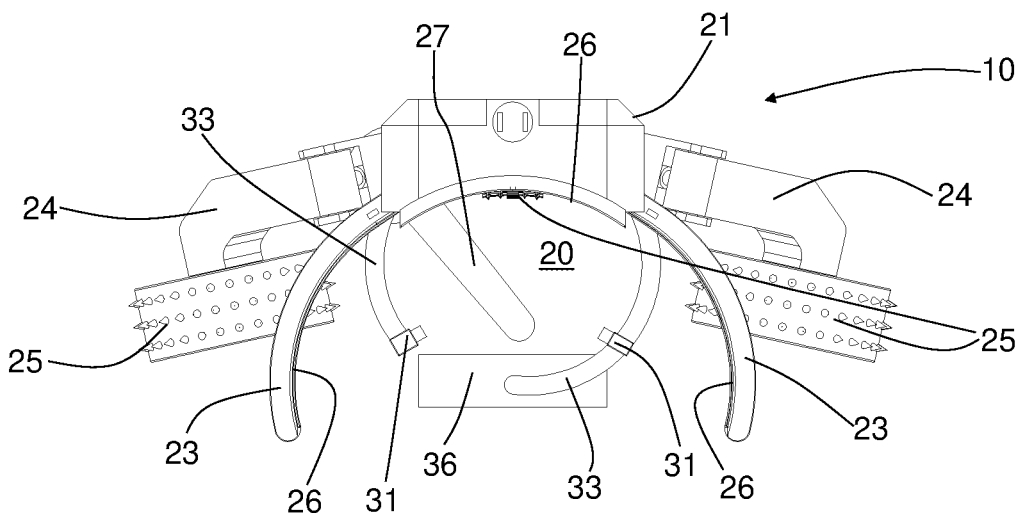
FIG. 5 is a view from above of the processing head in FIG. 2.
Figure 6:
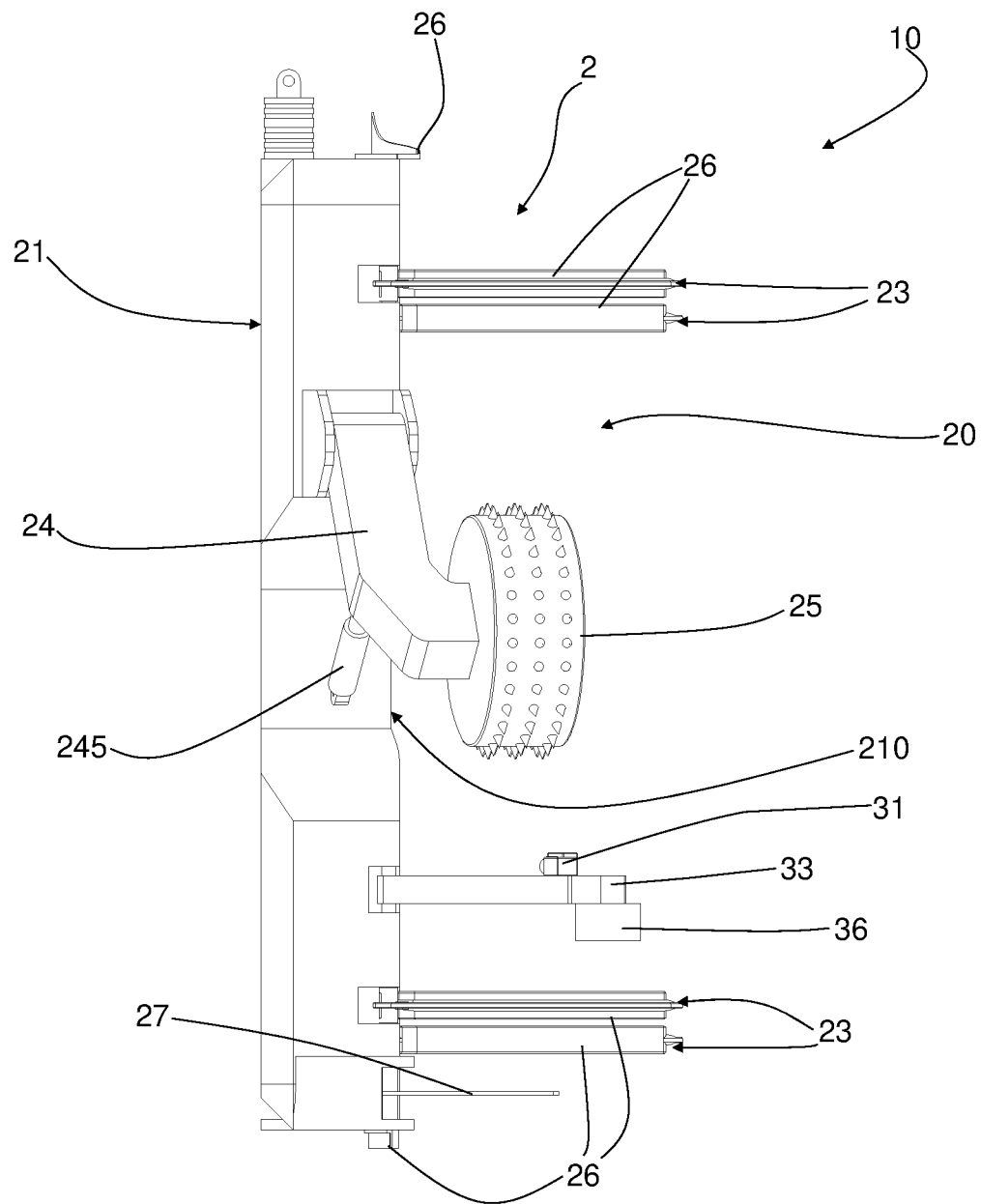
FIG. 6 is a side view of the processing head in FIG. 2.

As the trunk 92 moves in the longitudinal direction 90, the branches 94 impact against the blades 26 and are cut off, thanks also to the fact that the motive device pushes the trunk 92 at great force and speed. This is shown schematically in FIG. 2. In FIG. 2, the cut branches 94 are shown as knots 96 on the surface of the trunk 92. This is a simplification of the design, since short sections of the branches 94 could be present even after cutting.

The processing head 10 can also be provided with a cutting device 27 (in particular, a chainsaw) for cutting the trunk 92 perpendicularly or transversely to the longitudinal direction 90. This cutting device 27 can be used for felling the tree 9, thus separating the trunk 92 from a stump of the tree 9, or for splitting the trunk 92 into segments of trunk.

All steps described up to now can be performed according to the prior art.

Unlike in the prior art, the processing head 10 according to the present invention comprises a detection system that is configured to detect positions of the branches 94 and/or of the knots 96 on the trunk 92 as the trunk 92 advances through the seat 20. The detection system is managed by a computer, which can be on the processing head 10 and/or on the forestry machine 1.

In one embodiment, the detection system comprises one or more cameras 31 intended to capture images of the trunk 92. The cameras 31 face towards the seat 20 and are positioned to capture images of the lateral surface of the trunk 92 while the latter is received—and moved longitudinally—in the seat 20.

In particular, there are at least three cameras 31 so that, together, they are able to capture images of the entire circumference of the trunk 92. In the embodiment illustrated, two cameras 31 are mounted on respective arms 33, which are pivoted to the main body 21 and protrude therefrom in a similar way as the protruding arms 23; a third camera 31 is positioned in a housing 28 made in the main body 21, the housing 28 facing onto the face 210.

The images captured by the cameras 31 are stored and processed by the computer to determine the positions of the branches 94 and/or of the knots 96 on the trunk 92. In other words, an optical scan of the trunk 92 is made using the cameras 31 while the trunk is being processed by the processing head 10.

Relative to the longitudinal direction 90, the cameras 31 are positioned in between a first pair of protruding arms 23 and a second pair of protruding arms 23. Basically, relative to the advancement of the trunk 92 in the seat 20, the cameras 31 are positioned downstream from a group of blades 26. Consequently, the images captured by the cameras 31 are of the trunk 92 after the branches 94 have been cut off. This is advantageous because the risk of the cameras 31 being hit and damaged by the branches 94 is removed.

Nevertheless, the positions of the branches 94 can be detected in the images captured by the cameras 31, since the cross-sections of the branches 94 cut off (as well as the knots 96) can clearly be distinguished from the bark or the lateral surface of the trunk 92.

In one embodiment, the detection system comprises an x-ray apparatus intended to x-ray the trunk 92. The x-ray apparatus can be present in addition to or alternatively to the cameras 31. In the embodiment illustrated, both the cameras 31 and the x-ray apparatus are present.

The x-ray apparatus comprises an x-ray emitter 35 and an x-ray receiver 36. The x-ray emitter 35 and the x-ray receiver 36 are facing towards each other and face diametrically opposite parts of the seat 20 and of the trunk 92. During use, a central axis of a cone of x-rays emitted by the emitter 35 towards the receiver 36 is substantially perpendicular to the longitudinal direction 90 of the trunk 92, meaning that the trunk 92 is x-rayed as a succession of discoid slices as it advances in the seat 20. The x-ray apparatus thus makes an x-ray scan of the trunk 92 while the latter is being processed by the processing head 10 and, overall, an x-ray of the entire trunk is obtained.

Likewise as described above for the cameras 31, the x-ray images captured by the x-ray receiver 36 are stored and processed by the computer to determine the positions of the branches 94 and/or of the knots 96 on the trunk 92. The x-ray emitter 35 and the x-ray receiver 36 are positioned downstream from a group of blades 26 relative to the advancement of the trunk 92 in the seat 20, and consequently the x-ray images captured are of the trunk 92 after the branches 94 have been cut off. Since the cross-sections of the branches 94 cut off and the knots 96 form discontinuities that absorb the x-rays differently from the rest of the wood of the trunk, they are detectable in the x-ray images and, therefore, the positions of the branches 94 and/or of the knots 96 can be determined.

In the embodiment illustrated, the x-ray emitter 35 is mounted on the main body 21, in particular in the housing 28 facing the face 210, whereas the x-ray receiver 36 is mounted on one of the arms 33 of the cameras 31.

In order to protect the operator on board the vehicle from the x-rays emitted by the emitter 35, the forestry machine 1 comprises at least one x-ray protective shield 18 that is placed in between the operator's station 16 and the processing head 10. For example, this protective shield 18 is a plate structure that is made of a suitable material such as lead and/or lead glass. In the embodiment illustrated, the protective shield 18 is mounted on the wall of the cabin 17 that is facing towards the processing head 10 and comprises a lead (or other material) plate and a lead glass window to allow the operator to see the processing head 10 during the processing operations. Alternatively, the cabin 17 is made at least partly of an x-ray protective material and, therefore, the cabin 17 itself is a protective shield 18.

In an alternative embodiment, the forestry machine 1 does not require an operator on board during the processing operations and, therefore, in particular, no x-ray protective shield is necessary.

In this alternative embodiment, the forestry machine 1 is controlled remotely (i.e. it can be controlled from a control station that is distinct and remote from the forestry machine 1) or is configured to operate in an automated way.

For this purpose, the forestry machine 1 can comprise video cameras, position sensors, at least one wireless communication device, at least one electronic data processing unit, control unit and/or any other device useful for allowing the forestry machine 1 to perform the processing operations in an automated way or based on commands received from a remote control station.

The solutions described above allow the forestry machine 1 to be equipped with an x-ray apparatus without this entailing a risk for the health and safety of the operators.

It should be noted that, if the detection system includes both the cameras 31 and the x-ray apparatus, the information obtained by these two detection devices can be combined and reciprocally validated to determine the positions of the branches 94 and/or of the knots 96. This is useful for obtaining greater accuracy and greater reliability than when using a single detection device.

It should also be noted that the x-ray apparatus enables the detection of knots inside the trunk 92, not only the detection of the knots 96 visible on the external surface of the trunk 92 as is the case of the cameras 31 and of the sensors 38 described below. Therefore, the x-ray apparatus—by itself or in combination with other detection devices—can provide highly complete information that can advantageously be used in the methods according to the present invention.

In one embodiment, the detection system comprises one or more sensors 38 configured to detect an impact between one of the blades 26 and a branch 94.

For example, the sensor 38 detects the moment at which the blade 26 comes into contact with an obstacle and the sensor 38 is able to distinguish if the obstacle is a branch 94, which can be overcome only by cutting the branch itself, or if it is a minor obstacle that is not a branch, such as a protrusion in the bark.

Since the advancement of the trunk 92 is controlled by the rollers 25 and can be measured, the readings of the sensors 38 can be converted into positions of the branches along the longitudinal axis 90.

In one embodiment, the one or more sensors 38 are associated with the one or more blades 26. Each sensor 38 is configured to detect if the blade 26 with which it is associated is cutting a branch 94 of the trunk 92. In particular, each sensor 38 is a load cell that is configured to detect a force acting on the blade 26 with which it is associated. In practice, the sensor 38 is a force sensor or an extensometer. Therefore, a threshold value of the force detected by the sensor 38 can be set, above which the obstacle is considered a branch and below which the obstacle is not considered a branch for the purposes described here.

In another embodiment, the one or more sensors 38 are accelerometers or vibration sensors, which are configured to detect a deceleration and/or vibrations produced by the impact between the blade 26 and the branch 94. As the trunk 92 advances longitudinally in the seat 20, when a blade 26 impacts against a branch 94 the longitudinal advancement is disturbed, thus producing a momentary deceleration in the advancement motion and/or vibrations in the processing head 10. The accelerometers or vibration sensors, which are mounted on the blades 26 or on the frame 2, detect the decelerations and/or vibrations produced. Also in this case, threshold values can be set for the deceleration and intensity of the vibrations detected, in order to distinguish the decelerations and vibrations that are actually due to the impact with a branch from decelerations and vibrations that have much lower values and are due, for instance, to simple irregularities on the surface of the trunk.

The set of sensors 38 can comprise both sensors that are load cells and sensors that are accelerometers or vibration sensors.

The sensors 38 can be present in addition to or alternatively to the cameras 31 and/or x-ray apparatus. In the embodiment illustrated, the sensors 38, the cameras 31 and the x-ray apparatus are present.

As mentioned above, the combined use of two or even three different detection devices is useful for obtaining greater accuracy and greater reliability in determining the positions of the branches 94 and/or of the knots 96.

In the embodiment described here, the processing head 10 comprises a measuring device 39 for measuring the advancement of the trunk 92 through the seat 20.

In particular, the measuring device 39 comprises an encoder. The measuring device 39, housed in the main body 21, is provided with a rotatable wheel 391 that is intended to come into contact with the surface of the trunk 92 and to be rotated by the longitudinally advancing trunk 92. Measuring the angular displacement of the rotatable wheel 391 enables the calculation of how much the trunk 92 has moved longitudinally.

The measurements obtained by the measuring device 39 are intended to be processed with the detections of the detection system, in order to determine information on the positions of the branches 94 and/or of the knots 96. Indeed, these measurements can be used to calculate the longitudinal distances between the branches 94 and/or the knots 96 detected.

However, it should be noted that the measuring device 39 may be absent and that the longitudinal distances between the branches 94 and/or the knots 96 detected could be calculated directly using the images obtained from the cameras 31 and/or the x-ray images obtained from the x-ray apparatus.

The detection system can also be configured to detect the local diameter of the trunk 92. For example, the local diameter can be derived from the distance between the rollers 25, since these are always in contact with the surface of the trunk 92 as it advances. Therefore, the local diameter can be measured using suitable sensors that enable the angle between the two arms 24 on which the rollers 25 are mounted to be determined. The local diameter values can be processed using the information on the positions of the branches 94 and/or of the knots 96 (and, in case, using the information derived from the encoder 39) to obtain an even more precise representation of the distribution of the branches 94 and/or of the knots 96 in the trunk 92.

The processing head 10 according to the present invention allows information on the positions of the branches 94 and/or of the knots 96 of a trunk 92 to be obtained during the processing by the head 10 itself, which is to say in the same processing step in which the branches 94 are cut from the trunk 92. As already mentioned above, such information can concern only the branches 94 and/or the knots 96 on the surface of the trunk 92 or also the knots inside the trunk 92, depending on the detection system with which the processing head 10 is equipped.

In one mode of use, such information can be used to decide how to split the trunk 92 into segments, so as to optimise the yield in terms of the quality of the products that can be obtained from the trunk 92.

For example, a long section of trunk with few branches and few knots can advantageously be used to produce long, high-quality boards and, therefore, it is preferable for the segment to include such a long section for the maximum length possible. However, for a trunk with many branches, the chosen length of the segment can be shorter to take into account other needs, such as the most suitable weight and dimensions for the transportation and handling of the segment itself.

It must be borne in mind that, in a wooden product (such as a board obtained from the trunk), knots usually constitute defects, the more serious the greater the size of the knots themselves.

The information on where, in a section of trunk, the branches and their corresponding knots are located, as well as information on their dimensions (which can easily be obtained from the images captured by the cameras 31 and/or from the x-rays produced by the x-ray apparatus), therefore allow an estimate of the defects of the products obtainable from that section of trunk. Generally, quality is inversely proportional to defectiveness.

Information on the size of the knots, or at least a value proportional to the sum of the dimensions of the knots in a certain region, can also be obtained via the force or vibration sensors, as these quantities are proportional to the strain of the blades 26 against the branches 94 they are cutting and, therefore, are proportional to the size of the respective knots.

In light thereof, the information on the positions of the branches 94 and/or of the knots 96 is processed to determine at least one position on the trunk 92 in which to cut the trunk 92 perpendicularly or transversely to the longitudinal direction 90, in order to split the trunk 92 into segments of trunk as desired on an optimisation basis. While the trunk 92 is still in the seat 20, the cutting device 27 is operated to cut the trunk 92 in the determined cutting position (or in several determined cutting positions), thus obtaining one or more segments of trunk.

In the processing head 10 according to the present invention, the cutting device 27 is therefore intended to be operated based on information on the positions of the branches 94 and/or of the knots 96 that are detected by the detection system.

It should be noted that, thanks to the motorised device for moving the trunk (in particular using rollers 25), the trunk 92 can be moved longitudinally in both directions and, therefore, can be suitably positioned so that the determined cutting position is in correspondence with the cutting device 27.

The information on the positions of the branches 94 and/or of the knots 96 can be processed in real time by the computer. The position in which to cut the trunk 92 can be optimised and chosen when the trunk is advancing and as the blades 26 are cutting the branches 94. If an optimal cutting position is already beyond the cutting device 27, the trunk 92 can be moved back, so as to cut where desired. Once a first segment has been cut, the remainder of the trunk 92 continues to move in the seat 20 and subsequent segments can be optimized in length and cut one after the other.

In another aspect of the present invention, the information on the positions of the branches 94 and/or of the knots 96 of the trunk 92 is intended to be processed to determine an identification code of the trunk 92, which is to say to determine a "fingerprint" of the trunk 92 that is based on the positions of the branches and/or of the knots and that, since each tree has a history of development that is different from all other trees, is substantially univocal for that specific trunk 92.

Therefore, the identification code allows the trunk 92 to be identified even after the tree has been processed by the processing head 10.

Based on the same principle, it is possible to determine an identification code for a segment obtained from the trunk 92.

Basically, the invention also relates to the use of the information on the positions of branches and/or of knots on a trunk of a tree for determining an identification code for said trunk or for a segment obtained from said trunk.

The information on the positions of the branches 94 and/or of the knots 96 on the trunk 92, or in case the identification code already determined, is intended to be stored in a database together with other information relating to the trunk 92 or to the segment of trunk. For example, such other information may include the cutting place and date for the tree, the wood species, quality assessments, defects, cutting patterns.

The identification code obtained via the detection system of the processing head 10 is comparable against a code determined a posteriori for a specific trunk or for a specific segment of trunk, in order to establish whether the specific trunk or the specific segment of trunk corresponds to a trunk 92 processed by the processing head 10 or to a segment of the trunk 92.

The code for the specific trunk can be determined a posteriori, for instance via an optical scanning apparatus, an x-ray apparatus, a tomographic apparatus, or another apparatus that allows the positions of the cut branches and/or of the knots on the specific trunk or segment of trunk to be determined.

Basically, the code determined a posteriori allows other information relating to the trunk to be searched and found in the database.

For example, a sawmill that receives a specific trunk can determine—a posteriori—the identification code and, using this, can find the information relating to the trunk in the database, including the region where the tree from which the trunk was obtained grew.

The sawmill then proceeds to cut the trunk into products, such as boards, whose quality it can assess. Thanks to this information, it is possible to search or establish a relationship between the quality of the products obtained from a trunk and the region where the trunk itself originated. For example, an assessment based on a certain number of trunks could show that the trees in a certain area provide higher-quality products than in other areas, or that the quality of the trees in a certain area make them particularly suitable for a specific type of product rather than for other types of product.

Therefore, the identification codes obtained via the detection system of the processing head 10 can also facilitate a subsequent processing of information that is useful for the forestry industry.

In one mode of use of the forestry machine 1 according to the present invention, a drone can be used to produce a first estimate of the shape of a tree to be processed. The drone, flying over a wood or in the wood, or potentially over trees already felled, takes photographic images of the trees; these images can be processed to obtain initial information on the shape of a tree and on the position of the branches in that tree, which is then processed by the processing head 10 of the forestry machine 1. During the subsequent processing step, the initial information obtained from the images is combined with the information detected by the detection system of the processing head 10. This is useful for further increasing precision and reliability in determining the positions of the branches 94 and/or of the knots 96 (and therefore in determining the identification code or for optimising the splitting of the trunk into segments).

To allow the information obtained from the images to be easily associated with the information detected by the processing head (in other words, to ensure that, during processing, the information relates to the same tree), both the drone and the forestry machine (or the processing head) are equipped with geographic location sensors (for example, GPS) that enable the detection of the geographic position of the tree photographed and of the tree processed.

Many modifications and variations can be made to the invention as designed herein without departing from the scope of protection of the accompanying claims. All details can be replaced by other technically equivalent details and any materials, shapes and dimensions of the various components may be used according to requirements.

The invention claimed is:

1. A processing head (10) for a forestry machine (1), the processing head (10) for processing a tree (9) having a trunk (92) with a longitudinal direction (90), branches (94) extending from the trunk (92) transversely to the longitudinal direction (90) and knots (96) extending into the trunk (92), the processing head (10) comprising:
a frame (2) having a seat (20) for receiving the trunk (92) of the tree (9) to be processed;
a motorised device for moving the trunk (92) relative to the seat (20), wherein the motorised device advances the trunk (92) through the seat (20) along the longitudinal direction (90) of the trunk (92);

one or more blades (26) for cutting the branches (94) from the trunk (92) as the trunk (92) advances through the seat (20);

a detection system that is managed by a computer and detects positions of the branches (94) and/or of the knots (96) on the trunk (92) during a processing of the tree (9) in which the branches (94) are cut from the trunk (92) as the trunk (92) advances through the seat (20);

whereby information on the positions of the branches (94) and/or of the knots (96) on the trunk (92) is obtained during the processing of the tree (9) by the processing head (10) itself and is processed by the computer.

2. The processing head (10) according to claim 1, wherein the detection system comprises one or more cameras (31) to capture images of the trunk (92), so that an optical scan of the trunk (92) is made while the trunk (92) is being processed by the processing head (10), captured images being stored and processed by the computer to determine the positions of the branches (94) and/or of the knots (96) on the trunk (92).

3. The processing head (10) according to claim 1, wherein the detection system comprises an x-ray apparatus (35, 36) to x-ray the trunk (92), so that an x-ray scan of the trunk (92) is made while the trunk (92) is being processed by the processing head (10), x-ray images captured by the x-ray apparatus are stored and processed by the computer to determine the positions of the branches (94) and/or of the knots (96) on the trunk (92).

4. The processing head (10) according to claim 1, wherein the detection system comprises one or more sensors (38) which detect an impact between one of said one or more blades (26) and a branch (94).

5. The processing head (10) according to claim 4, wherein said one or more sensors (38) are associated with said one or more blades (26) and each sensor (38) is a load cell which detects a force acting on the blade (26) with which it is associated.

6. The processing head (10) according to claim 1, comprising a measuring device (39) for measuring the advancement of the trunk (92) through the seat (20).

7. The processing head (10) according to claim 1, comprising a cutting device (27) for cutting the trunk (92) perpendicularly or transversely to the longitudinal direction (90), wherein the cutting device (27) is capable of being operated based on information on the positions of the branches (94) and/or of the knots (96) that is detected by the detection system.

8. A forestry machine (1) comprising the processing head (10) according to claim 1, the forestry machine (1) being a vehicle equipped with a mechanical arm (12), the processing head (10) being mounted on the mechanical arm (12).

9. The forestry machine (1) according to claim 8, the detection system comprising an x-ray apparatus (35, 36) which x-rays the trunk (92), wherein the forestry machine (1) comprises a station (16) for an on-board operator and at least one x-ray protective shield (18), the at least one protective shield (18) being placed in between the station (16) and the processing head (10).

10. The processing head (10) according to claim 4, wherein said one or more sensors (38) are accelerometers or vibration sensors which detect deceleration and/or vibrations produced by said impact.

11. The processing head (10) according to claim 2, wherein the detection system comprises an x-ray apparatus (35, 36) which x-rays the trunk (92).

12. The processing head (10) according to claim 11, wherein the detection system comprises one or more sensors (38) which detect an impact between one of said one or more blades (26) and a branch (94).

13. The processing head (10) according to claim 2, wherein the detection system comprises one or more sensors (38) which detect an impact between one of said one or more blades (26) and a branch (94).

14. The processing head (10) according to claim 6, wherein the measuring device (39) comprises an encoder.

15. The forestry machine (1) according to claim 8, wherein the forestry machine (1) does not require an on-board operator, and wherein either the forestry machine (1) is controllable remotely from a control station that is distinct and remote from the forestry machine (1), or the forestry machine (1) is operatable in an automated way.

* * * * *